United States Patent [19]
Lecomte

[11] Patent Number: 6,065,272
[45] Date of Patent: May 23, 2000

[54] DEVICE FOR COLLECTING AND CONFINING HOSPITAL AND HOUSEHOLD WASTE

[75] Inventor: Michel Lecomte, Dompierre-sur-Mer, France

[73] Assignee: Captiva Holding, France

[21] Appl. No.: 09/068,796

[22] PCT Filed: Nov. 17, 1995

[86] PCT No.: PCT/FR95/01520

§ 371 Date: Nov. 4, 1998

§ 102(e) Date: Nov. 4, 1998

[87] PCT Pub. No.: WO97/18992

PCT Pub. Date: May 29, 1997

[51] Int. Cl.[7] .............. B65B 9/15; B65B 67/12; B65F 1/06
[52] U.S. Cl. ................. 53/576; 53/459; 53/567
[58] Field of Search ............... 53/576, 575, 567, 53/570, 574, 459, 457, 468, 469, 467

[56] References Cited

U.S. PATENT DOCUMENTS

| | | | |
|---|---|---|---|
| 3,452,368 | 7/1969 | Couper | 53/576 X |
| 3,892,059 | 7/1975 | Widigs | 53/370 X |
| 3,908,336 | 9/1975 | Forslund | 53/576 |
| 4,790,124 | 12/1988 | Kaji | 53/576 X |
| 4,869,049 | 9/1989 | Richards et al. | 53/576 X |
| 5,155,976 | 10/1992 | Okabe et al. | 53/576 X |

FOREIGN PATENT DOCUMENTS

| | | |
|---|---|---|
| 0005660 | 11/1979 | European Pat. Off. . |
| 0281355 | 9/1993 | European Pat. Off. . |
| 2508788 | 1/1983 | France . |
| 2364180 | 7/1974 | Germany . |

*Primary Examiner*—James F. Coan
*Attorney, Agent, or Firm*—Ostrolenk, Faber, Gerb & Soffen, LLP

[57] ABSTRACT

The invention relates to a device for wrapping contaminant or non-contaminant waste resulting from the medical treatment of humans or animals, as well as household waste. The device shown in FIG. 1 consists of a housing (1) used as a frame supporting a dispenser (2) for a heat-sealable plastic sleeve (3) forming a receptacle in which the waste may be deposited, a driving mechanism (4) for moving the sleeve, a heat-sealing mechanism (5), and a removable storage receptacle (6). The device is characterized in that the size of the wrapping may be selectively adapted to that of the waste objects. The device is useful for confining waste in wrappings that are impervious to volatile fumes, odours and liquids regardless of the position of the wrappings during storage and transport.

8 Claims, 2 Drawing Sheets

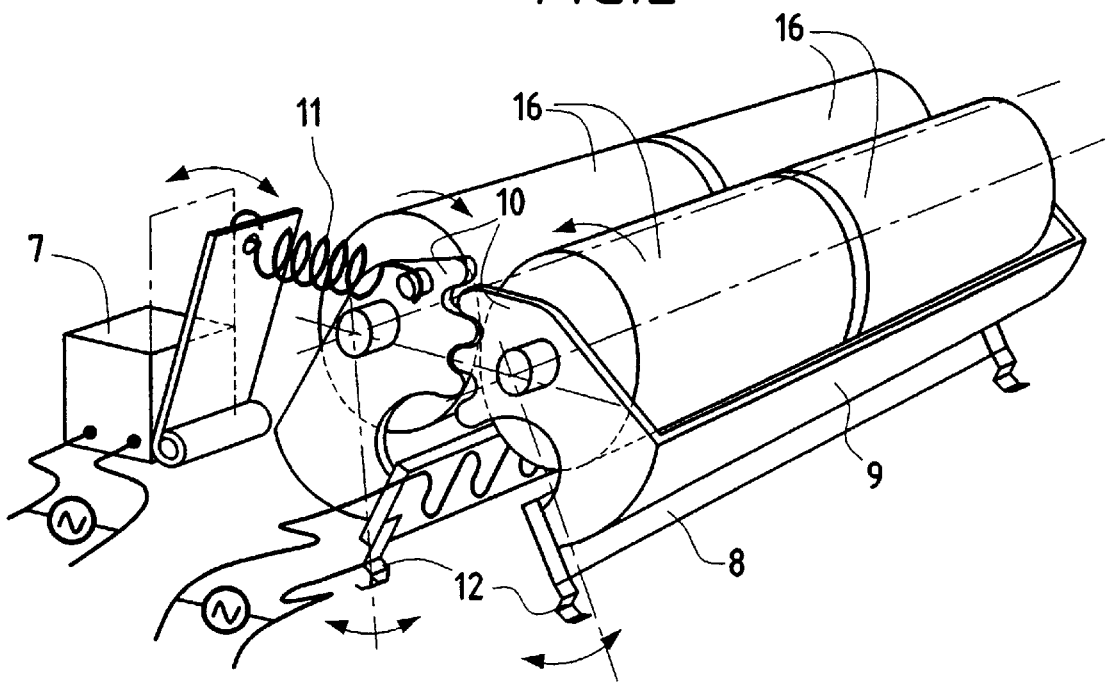
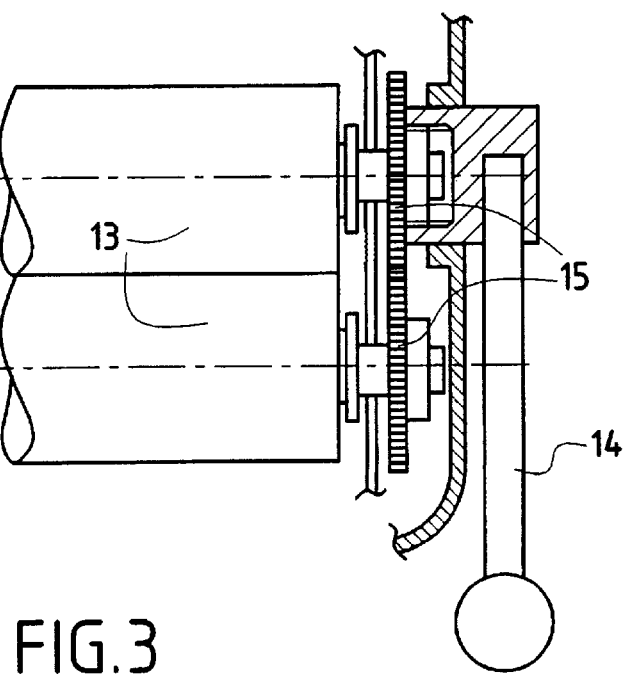

DEVICE FOR COLLECTING AND CONFINING HOSPITAL AND HOUSEHOLD WASTE

The present invention relates to a device for wrapping household refuse and waste and waste resulting from medical care administered to humans and animals as well as the waste produced by the activities connected with this care.

At the present time, the wrapping of waste is taken care of by using plastic bags or plastic-coated boxes. This type of wrapping does not enable the gases or odours issuing from the waste, to be correctly confined.

This results in a volatile propagation of pathogenic germs and unpleasant smells, which presents a problem of potential contamination, particularly in health care facilities, maternity hospitals, veterinary clinics, medical laboratories, public toilets through women's sanitary towels, and more simply waste disposal units of apartment blocks.

The device according to the invention overcomes this shortcoming by wrapping the waste in envelopes which are air-, odour- and liquid-tight whatever the position of said envelopes after closure.

The device can in particular be fixed on waste disposal unit openings in apartment blocks, therefore guaranteeing constant cleanliness of the ducts and performing the role of anti-odour trap when being used.

Similar systems have already been studied, for example the one described in European Patent No. 281 355, but the latter obliges the user to push the objects in order to obtain advance of the sleeve; there is no driving system and the bags obtained are simply closed by twisting, which does not allow a real tightness.

In European Patent No. 05660, the system described does not enable the dimensions of the wrapping to be automatically adjusted and a system of pliers rather than rollers is used to advance the sleeve.

The dimensions of the wrapping can be modified by replacing an element of the mechanism, but giving another standardized dimension. The mechanism described is not functional for the systematic wrapping of each unitary deposit with systematic adaptation of the dimension of sleeve necessary;

The main innovation of the present invention is the systematic adaptation of the dimension of the wrapping to the waste.

BRIEF DESCRIPTION OF THE DRAWINGS

FIG. 2 is a diagonal view of the feed rollers and heat seal assembly.

FIG. 3 is a cross-section view of the feed roller drive mechanism.

Referring to FIG. 1, the device is constituted by a housing (1) acting as frame supporting in its upper part a dispenser (2) of heat-sealable plastic sleeve (3) forming receptacle for depositing the waste, a mechanism (4) for driving said sleeve just underneath, followed by a heat-sealing mechanism (5) then a removable receptacle (6) allowing the installation of a secondary wrapping with a view to periodic emptying.

Figure 1:
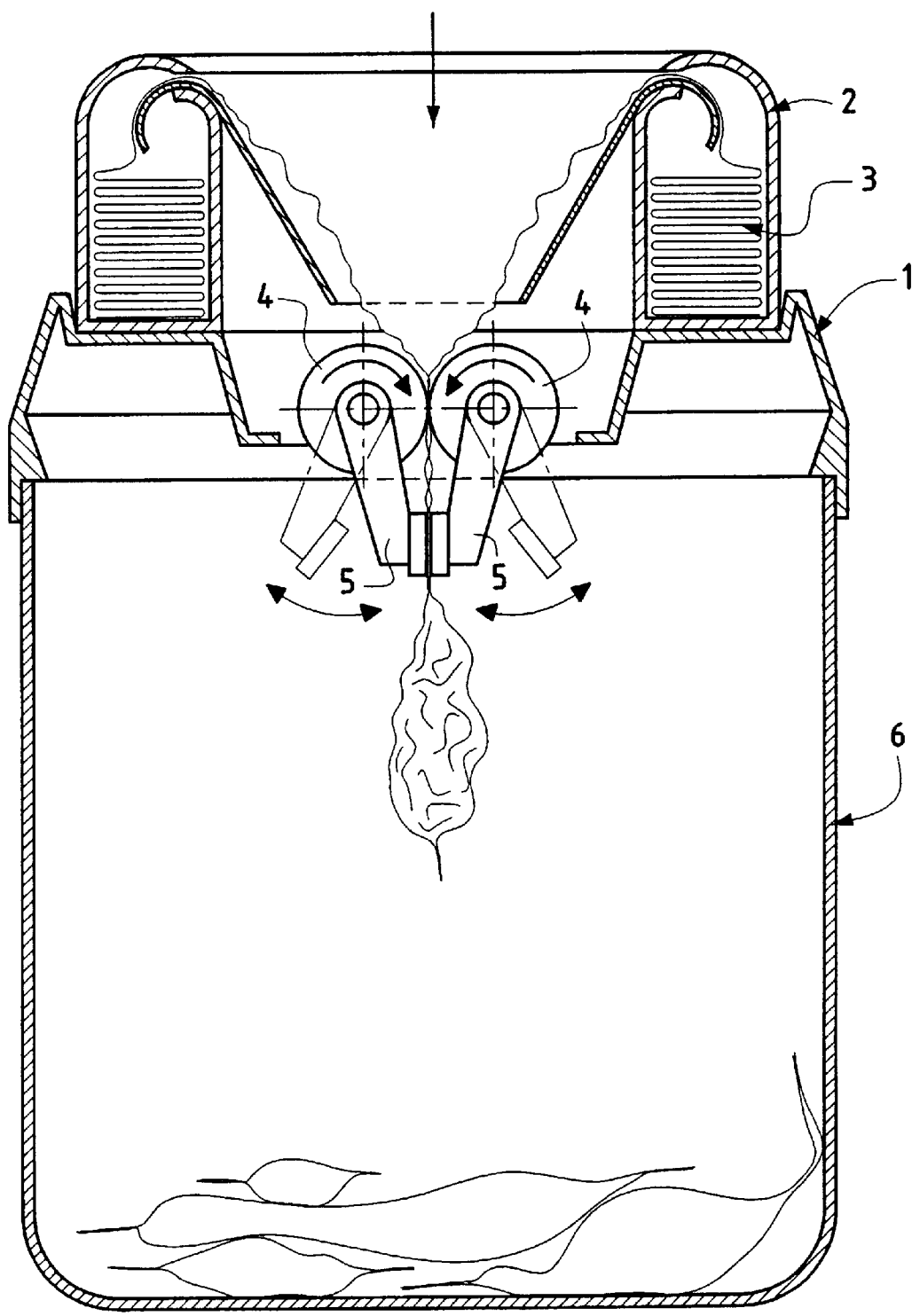
FIG. 1 is a side cut-away view of the apparatus.

The waste dropped into the primary receptacle drops to the bottom thereof to be driven by said sleeve (3), itself driven by friction between at least two rollers or wheels rotating in opposite directions with respect to each other, being disposed on the one hand so as to obtain a permanent contact pressure with the sleeve, disposed on the other hand so that the contact surfaces of said rollers move apart upon passage of the waste while conserving a contact pressure with the sleeve, the quantity of sleeve necessary for wrapping the waste and regenerating the soiled surfaces being connected with the number of rotations of said rollers, said number of rotations being adjustable as desired by the user or automatically by a detection system, the advance of the sleeve thus obtained driving the imprisoned waste beneath the rollers, tight closure being effected as desired or automatically by actuating heat-sealing pliers capable of cutting the sleeve in the middle of a wide weld effecting at the same time tightness of the envelope created and the bottom of the following envelope.

A mechanism for automatically or manually dispensing a neutralizing product of germicidal or like type, may be installed above the dispenser forming receptacle. Its operation may be determined by mechanical or electrical link by the operation of the sleeve driving mechanism.

The housing (1) may have an articulated hood mounted thereon.

According to the different embodiments and in accordance with FIGS. 1, 2 and 3:

The "dispenser, driving mechanism, heat-sealing mechanism" assembly may be disconnected from the receptable part and be fitted on any type of container designed for waste collection, and may even replace a waste disposal trap or can be integrated in a work surface of a fitted kitchen.

The dispenser (2) forming receptacle is removable and may be changed entirely whenever a new sleeve is reloaded.

The shape of the dispenser/receptacle makes it possible to obtain a surface for deposit of the waste protected from soiling by the presence of the sleeve. The polluted sleeve surface is enclosed with the waste during advance of the sleeve and the deposit surface is regenerated by a portion of new sleeve.

The driving mechanism (4) is constituted by a set of drive rollers (13) actuated manually by a steering wheel, a lever (14) or electrically by a motor.

Said mechanism may be actuated via a rack itself connected directly or indirectly to a manually operated lever. Such a configuration may allow a possible cap to be connected to said lever and to actuate the mechanism by manipulating said cap.

In any case, the rollers can be rotated only in the desired direction by the interposition of a disengagement system. Disengagement may be obtained by a blade or ball ratchet on the axes of the rollers.

The drive rollers are constituted by a rigid central pin of small diameter coated with an elastomer foam of large diameter. This choice allows a fixed distance between axes, the passage of the waste being effected by deformation of said elastomer foam coating, the rollers are mounted against one another by force in order to guarantee driving of the sleeve empty.

The rollers are fast in rotation thanks to gears (15) disposed at the end of the pin. These gears are of identical diameters to ensure that the rollers effect the same number of rotations.

In the case of actuation being effected by manual or motorized direct rotation, these gears are in direct engagement. In the case of actuation employing the translation of a rack, the latter may be placed between the gears, against a reduction in diameter of the latter.

The gears disposed at the end of roller axes can be mounted so as to rotate and present a notched bore whose shape allows blockage in one direction of rotation of one or more spring blades fast with the axes. Such an assembly ensures disconnection of the rollers in the case of reversal of the direction of rotation by manual steering wheel, lever, electric motor or rack.

The coating of the drive rollers present several circular openings (16) in order not to drive back the liquids contained in the waste.

The rollers may be designed with a thin coating on axes of small diameters; the distances between axes are then variable and the contact pressure maintained by return spring between the rollers.

Depending on the configurations, the quantity of sleeve necessary is obtained either by manual action with visual control, or by automatic detection by means of photoelectric cells or mechanical feelers installed above the dispenser/receptacle on a possible support or hood.

The quantity of sleeve used for each deposit may be standard for specific applications such as the collection of women's sanitary towels in public places, trains, railway stations, aircraft, hotels, maternity clinics, etc . . .

Closure of the wrapping by heat-sealing is effected thanks to a set of retractable heating pliers (5).

Closure of said pliers may be obtained by electrically switching on an electro-magnet (7) and heating resistors (8) simultaneously, or via a lever.

Said switching on is obtained by actuating a contactor. Said contactor may be actuated, depending on the configurations, either manually or automatically at the end of rotation of the drive rollers.

The heating temperature for welding is pre-adjusted during manufacture in the factory, and the time required for the heating pliers to close, like the soldering time, is defined by a timing device.

The supports (9) of heating resistors (8) for heat-sealing may be fixed free to rotate on the rigid pin of the drive rollers (13) and thus constitute the jaws for gripping the sleeve. Such an assembly guarantees the positioning of the weld and simplifies the overall set-up.

Said supports (9) are rendered fast in rotation thanks to the partial gears (10) disposed at their ends.

Closure of the pliers thus constituted may be ensured by displacing an articulated rod fixed on one of the jaws on the one hand and fixed to an electromagnet (7) on the other hand.

The pressure of closure may be limited by a spring device (11) integrated with said rod or placed in interface with the electromagnet or between the master jaw and the rod.

The welding resistors (8) disposed on the supports (9) may present at their ends mechanical contacts for example incorporating plates enabling the electric circuit to be closed during contact.

Such an assembly prevents untimely heating of the resistors in the event of defective closure of the pliers. Welding can therefore not be effected in the presence of insufficiently dropped waste. Wiring is therefore simplified.

The timing device releases the pliers for a complementary advance.

A manual contactor may shunt the timing device to that end.

The shape of the surfaces of the heating part of the jaws which comes into contact with the sleeve upon closure of the pliers may present an excrescence capable of cutting said sleeve wholly or partly in the middle of the zone welded by creeping in the softening phase.

In a configuration using a direct manual lever (14), the rotation of the latter may be coaxial with a roller and in constant engagement with the disconnectable gear of said roller. Alternative actuation of the lever allows the advance of the sleeve and at the end of stroke closes the heating resistor supports which may be switched on thanks to the closure of the circuit by plate contacts upon contact.

In a simplified configuration, wrapping may be effected without welding at each deposit, the sleeve thus forming a sock of which closure by welding or the like is ensured solely at the end of stock or periodic emptying. On the other hand, this configuration is not applicable on a waste disposal unit by reason of the dimensions of the common duct.

In order to facilitate the leader function during replacement, the new sleeve cartridges present a cardboard or like tongue which is engaged in the drive mechanism.

In relation with the different technical elements of set-up, the following modes of operation are demonstrated:

In Automatized configuration: The user drops or deposits his/her waste in the upper receptacle, the presence detector triggers off an electric motor actuating the rollers, driving the sleeve and the waste. The detector no longer detecting presence in the upper receptacle, the rollers continue to rotate in cooperation with a timing device adjusted to guarantee a complementary advance. Such complementary advance is intended not to try to weld in the presence of waste and, if desired, totally to regenerate the zones likely to be soiled. Stoppage of the motor triggers off closure of the welding pliers, welding being effected in cooperation with a timing device and the cut sachet drops into the lower receptacle. The user necessarily triggers off wrapping as soon as he/she deposits the waste.

In Semi-manual configuration: The operator actuates a contactor to rotate the rollers and to maintain contact until the waste disappears. Abandon of this contact provokes stoppage of the motor and therefore of the advance and simultaneously via a timed relay actuates the welding/cutting mechanism. At the end of timing, all the relays become inactive again. If the welding pliers cannot close correctly, a warning lamp lights up and indicates to the user to reactuate the advance.

In Manual configuration: The operator actuates advance and welding/cutting as desired by means of two distinct contactors, a relay preventing the simultaneous switching on of the two contactors. If the welding pliers cannot close, a warning lamp lights up and indicates to the user to reactuate the advance.

In Configuration with direct manual rotation: The operator actuates as desired a lever or a steering wheel connected mechanically to the rollers until the waste disappears, then by means of a contactor proceeds with welding/cutting. If the pliers cannot close, a warning lamp lights up and indicates to the user to reactuate the advance.

In the manual configuration, the operator may omit to proceed with welding, the waste then being wrapped in a "sock", but the constant pressure of the rollers on the sleeve allows an already consequent confinement, in the same way as in the case of breakdown of the pliers in the automatized version. A configuration provided without welding may be envisaged depending on the application and thus provide an independent, simple, inexpensive dustbin or trash can.

I claim:

1. A device for wrapping waste resulting from human and animal medical care, as well as household waste, comprising:

a housing having an upper part;

a dispenser having a heat-sealable plastic sleeve forming a primary waste receptacle;

a driving mechanism for driving said sleeve, said driving mechanism being disposed underneath said dispenser and comprising:

at least two friction driving rollers rotating in opposite directions with respect to each other for driving said sleeves, each driving roller comprising a rigid axis of reduced diameter, said axis being coated with a layer of a material with high elastic deformation, said layer having a larger thickness;

means for applying said rollers on said sleeve with pressure, whereby said contact pressure is maintained when waste within the sleeve passes between said rollers, means for rotating said rollers with a given number of rotations; and heat sealing pliers for welding said sleeve on a given length and for cutting said sleeve in said welded length whereby the portion of sleeve with the waste tightly contained therein is separated from the rest of the sleeve.

2. The device according to claim 1, wherein at least one of said rollers has at least one reduction in diameter in order not to drive back waste liquids.

3. The device according to claim 1, wherein said heat sealing pliers comprise two movable supports, each support being provided with a heating-resistor, said device further comprising contact means mounted on said supports and switching means for controlling the heating of said resistors, said switching means being activated for heating said heating-resistor in response to the state of the contact means corresponding to the fact that no waste is present in the sleeve between the two supports.

4. The device according to claim 1, wherein said axis of the rollers have ends and said means for applying said rollers on said sleeve comprises return springs disposed between said ends of said axis of the rollers.

5. the device according to claim 1, wherein said means for rotating said rollers further comprise a disconnection mechanism for preventing reversal of the direction of rotation of said rollers.

6. The device according to claim 3, wherein each support of said heat sealing pliers is rotatably mounted about an axis which is coaxial with the axis of one of said rollers.

7. The device according to claim 1, wherein said sleeve is provided with a leader for manually pushing it between said rollers.

8. The device according to claim 1 further comprising detection means for detecting the presence of waste in said waste receptacle and wherein said means for rotating said rollers further comprises motor means for rotating said rollers and control means for controlling said motor means in response to the detection implemented by said detection means.

* * * * *